US012445782B2

(12) United States Patent
Littrell et al.

(10) Patent No.: US 12,445,782 B2
(45) **Date of Patent: *Oct. 14, 2025**

(54) PIEZOELECTRIC MEMS DEVICE FOR PRODUCING A SIGNAL INDICATIVE OF DETECTION OF AN ACOUSTIC STIMULUS

(71) Applicant: QUALCOMM Incorporated, San Diego, CA (US)

(72) Inventors: Robert John Littrell, Belmont, MA (US); Ronald Gagnon, Boston, MA (US); Karl Grosh, Boston, MA (US)

(73) Assignee: QUALCOMM Incorporated, San Diego, CA (US)

( * ) Notice: Subject to any disclaimer, the term of this patent is extended or adjusted under 35 U.S.C. 154(b) by 179 days.

This patent is subject to a terminal disclaimer.

(21) Appl. No.: 18/190,719

(22) Filed: Mar. 27, 2023

(65) Prior Publication Data

US 2023/0308808 A1 Sep. 28, 2023

Related U.S. Application Data

(63) Continuation of application No. 15/930,530, filed on May 13, 2020, now Pat. No. 11,617,041, which is a (Continued)

(51) Int. Cl.
*H04R 17/00* (2006.01)
*H04R 3/00* (2006.01)
(Continued)

(52) U.S. Cl.
CPC ............. *H04R 17/025* (2013.01); *H04R 3/00* (2013.01); *H04R 3/04* (2013.01); *H04R 17/02* (2013.01); *H04R 2201/003* (2013.01)

(58) Field of Classification Search
CPC ....... H04R 3/00; H04R 3/04; H04R 2201/003
(Continued)

(56) References Cited

U.S. PATENT DOCUMENTS 3,636,463 A 1/1972 Ongkiehong
4,991,145 A 2/1991 Goldstein et al.
(Continued)

FOREIGN PATENT DOCUMENTS

CN 103019373 A 4/2013
CN 104050973 A 9/2014
(Continued)

OTHER PUBLICATIONS

CN Search Report in Chinese Application No. 201780026345.6, dated May 11, 2020, 2 pages.

(Continued)

*Primary Examiner* — William A Jerez Lora
(74) *Attorney, Agent, or Firm* — QUALCOMM Incorporated; Espartaco Diaz Hidalgo

(57) ABSTRACT

A device comprising: a sensor; and a first circuit configured to detect when an input stimulus to the sensor satisfies one or more detection criteria, and further configured to produce a signal upon detection that causes adjustment of performance of the device; and a second circuit for processing input following detection, wherein the second circuit is configured to increase its power level following detection, relative to a power level of the second circuit prior to detection.

27 Claims, 11 Drawing Sheets

Related U.S. Application Data continuation of application No. 16/081,015, filed as application No. PCT/US2017/019996 on Feb. 28, 2017, now Pat. No. 10,715,922.

(60) Provisional application No. 62/442,221, filed on Jan. 4, 2017, provisional application No. 62/301,481, filed on Feb. 29, 2016.

(51) Int. Cl.
*H04R 3/04* (2006.01)
*H04R 17/02* (2006.01)

(58) Field of Classification Search
USPC .......................................................... 381/114
See application file for complete search history.

(56) References Cited

U.S. PATENT DOCUMENTS

| | | | |
|---|---|---|---|
| 5,323,141 | A | 6/1994 | Petek |
| 5,644,308 | A | 7/1997 | Kerth et al. |
| 6,243,595 | B1 | 6/2001 | Lee et al. |
| 7,418,392 | B1 * | 8/2008 | Mozer .................... G10L 13/00 315/307 |
| 7,948,153 | B1 | 5/2011 | Kellogg et al. |
| 9,425,818 | B1 | 8/2016 | Rajaee et al. |
| 9,799,337 | B2 | 10/2017 | Chang et al. |
| 10,001,391 | B1 | 6/2018 | Littrell |
| 10,028,054 | B2 | 7/2018 | Furst et al. |
| 10,715,922 | B2 | 7/2020 | Littrell |
| 2003/0042117 | A1 | 3/2003 | Ma |
| 2005/0038651 | A1 * | 2/2005 | Zhang .................... G10L 25/78 704/E11.003 |
| 2006/0195164 | A1 | 8/2006 | Sondergaard et al. |
| 2007/0129941 | A1 | 6/2007 | Tavares |
| 2010/0039923 | A1 | 2/2010 | Kim et al. |
| 2011/0142261 | A1 | 6/2011 | Josefsson |
| 2011/0233693 | A1 | 9/2011 | Perruchot et al. |
| 2012/0026716 | A1 | 2/2012 | Bauer et al. |
| 2012/0087521 | A1 | 4/2012 | Delaus et al. |
| 2012/0250909 | A1 | 10/2012 | Grosh et al. |
| 2012/0299937 | A1 | 11/2012 | Brown et al. |
| 2013/0101128 | A1 | 4/2013 | Lunner et al. |
| 2013/0110521 | A1 | 5/2013 | Hwang et al. |
| 2013/0132095 | A1 | 5/2013 | Murthi et al. |
| 2013/0195288 | A1 | 8/2013 | Ye |
| 2013/0223635 | A1 | 8/2013 | Singer et al. |
| 2013/0301101 | A1 | 11/2013 | Conrad et al. |
| 2013/0322215 | A1 | 12/2013 | Du et al. |
| 2014/0003630 | A1 | 1/2014 | Demiya et al. |
| 2014/0270197 | A1 | 9/2014 | Krishnamurthy et al. |
| 2014/0270259 | A1 | 9/2014 | Goertz et al. |
| 2014/0363010 | A1 | 12/2014 | Christopher et al. |
| 2015/0043747 | A1 * | 2/2015 | Barham .................. H03G 3/20 381/98 |
| 2015/0043755 | A1 * | 2/2015 | Furst ................... H04R 19/005 381/114 |
| 2015/0049884 | A1 | 2/2015 | Ye |
| 2015/0208165 | A1 | 7/2015 | Volk et al. |
| 2015/0215698 | A1 | 7/2015 | Haiut |
| 2015/0249881 | A1 | 9/2015 | Ruan et al. |
| 2015/0256914 | A1 | 9/2015 | Wiesbauer et al. |
| 2015/0271606 | A1 | 9/2015 | Grosh et al. |
| 2015/0350774 | A1 | 12/2015 | Fürst et al. |
| 2015/0350792 | A1 | 12/2015 | Grosh et al. |
| 2016/0066113 | A1 | 3/2016 | Elkhatib et al. |
| 2016/0098921 | A1 * | 4/2016 | Qutub ................... G08C 23/02 367/197 |
| 2016/0134966 | A1 | 5/2016 | Fitzgerald et al. |
| 2016/0260441 | A1 * | 9/2016 | Muehlhausen ......... G06F 3/012 |
| 2016/0314805 | A1 | 10/2016 | Mortazavi et al. |
| 2017/0150254 | A1 | 5/2017 | Bakish et al. |
| 2017/0214968 | A1 | 7/2017 | Braithwaite et al. |
| 2017/0223450 | A1 * | 8/2017 | Paton Alvarez ......... H04R 3/00 |
| 2017/0238106 | A1 | 8/2017 | Theill |
| 2017/0245076 | A1 | 8/2017 | Kusano et al. |
| 2018/0352356 | A1 | 12/2018 | Amir |
| 2019/0098417 | A1 | 3/2019 | Littrell et al. |
| 2020/0296513 | A1 | 9/2020 | Littrell et al. |
| 2020/0296530 | A1 | 9/2020 | Littrell |
| 2020/0336841 | A1 | 10/2020 | Zeleznik et al. |
| 2020/0344555 | A1 | 10/2020 | Littrell et al. |
| 2020/0408799 | A1 | 12/2020 | Littrell |
| 2021/0193901 | A1 | 6/2021 | Umezawa et al. |

FOREIGN PATENT DOCUMENTS

| | | | |
|---|---|---|---|
| CN | 203882609 | U | 10/2014 |
| CN | 104918178 | A | 9/2015 |
| JP | 2015206974 | A | 11/2015 |
| KR | 20140036790 | A | 3/2014 |
| KR | 20150105919 | A | 9/2015 |
| KR | 20160010606 | A | 1/2016 |
| WO | 2017151650 | A1 | 9/2017 |

OTHER PUBLICATIONS

European Office Action in European Application No. EP17760637, dated Sep. 8, 2020, 5 pages.
Freedman D.S., et al., "An Analog VLSI Implementation of the Inner Hair Cell and Auditory Nerve Using a Dual AGC Model", IEEE Transactions on Biomedical Circuits and Systems, vol. 8, No. 2, Apr. 2014, pp. 240-256.
International Preliminary Report on Patentability—PCT/US2017/019996, the International Bureau of WIPO—Geneva, Switzerland, Sep. 13, 2018.
International Search Report and Written Opinion—PCT/US2017/019996—ISA/EPO—May 11, 2017.
International Search Report and Written Opinion—PCT/US2020/022932—ISA/EPO—Jun. 18, 2020.
International Search Report and Written Opinion—PCT/US2020/022973—ISA/EPO—Jun. 12, 2020.
International Search Report and Written Opinion—PCT/US2020/039746—ISA/EPO—Nov. 20, 2020.
Office Action for CN. Application. No. 201780026345, mailed May 20, 2020.
Office Action for CN. Application. No. 201780026345.6, mailed Mar. 18, 2021.
Supplementary European Search Report—EP17760637—Search Authority—The Hague—Jul. 23, 2019.
Synopsys, "Ultra-Low Power Voice Control for Mobile", 2015.
European Search Report—EP24158722—Search Authority—The Hague—Jun. 3, 2024.

* cited by examiner

400

450

PIEZOELECTRIC MEMS DEVICE FOR PRODUCING A SIGNAL INDICATIVE OF DETECTION OF AN ACOUSTIC STIMULUS

CLAIM OF PRIORITY

This application is a continuation application of U.S. patent application Ser. No. 15/930,530, filed May 13, 2020, which claims priority under 35 U.S.C. § 119(e) to U.S. patent application Ser. No. 16/081,015, filed Aug. 29, 2018, which is a U.S. national phase application under 35 U.S.C. 371 of PCT/US2017/019996, filed Feb. 28, 2017, which in turn claims priority under 35 U.S.C. § 119(e) to U.S. Provisional Application Nos. 62/301,481, filed Feb. 29, 2016, and 62/442,221, filed Jan. 4, 2017, the entire contents of each of which are incorporated herein by reference.

BACKGROUND

Piezoelectric transducers are a type of electroacoustic transducer that convert electrical charges (e.g., produced by sound or input pressure) into energy.

SUMMARY

In some examples, a device comprises a sensor; and a first circuit configured to detect when an input stimulus to the sensor satisfies one or more detection criteria, and further configured to produce a signal upon detection that causes adjustment of
performance of the device; and a second circuit for processing input following
detection, wherein the second circuit is configured to increase its power level following
detection, relative to a power level of the second circuit prior to detection. Other embodiments of this aspect include corresponding computer systems, apparatus, and computer programs recorded on one or more computer storage devices, each configured to perform the features of the devices.

In this example, the device includes one or more of the following features
and/or any combination thereof. The input stimulus comprises an acoustic input stimulus. The input comprises an acoustic input. The signal causes adjustment of performance of the device by causing an external processor to transmit an instruction to the device to increase the power level of the second circuit, relative to the power level
of the second circuit prior to detection. The signal causes adjustment of performance of
the device by causing the device to increase the power level of the second circuit, relative to the power level of the second circuit prior to detection. The second circuit is substantially powered off prior to detection. The device is configured to receive a
signal from a processor external to the device, with the signal being for powering off the first circuit and for powering on the second circuit. The device is configured to receive a signal from a processor external to the device, with the signal being for reducing a power level of the first circuit, relative to a power level of the first circuit prior to detection, and with the signal further being for increasing the power level of the second circuit, relative to the power level of the second circuit prior to detection. The device further includes a third circuit with logic for reducing a power level of the first circuit, relative to a power level of the first circuit prior to detection, and for increasing the power level of the second circuit, relative to the power level of the second circuit prior to detection. The first circuit is configured to operate at substantially 8 microAmps. The second circuit is configured to operate using 20-350 microAmps. A criteria includes a criteria of an input pressure stimulus to the sensor reaching a threshold input level. The device includes a packaged device for mounting on another circuit, wherein the packaged device includes a substrate for mounting the sensor, the first circuit and the second circuit, and wherein the packaged device includes a housing portion. The device includes a piezoelectric device. The device includes a microphone or a microelectromechanical systems (MEMS) microphone. The device includes a pad configured to transmit, to an external processor, a signal that specifies that the input stimulus to the sensor satisfies at least one of the one or more detection criteria. The device include a pad configured to receive, from an external processor, a signal that causes the device to switch from a first mode to a second mode. The first mode comprises a mode in which the first circuit is substantially powered on and the second circuit is substantially powered off. The second mode comprises a mode in which the second circuit is substantially powered on and the first circuit is substantially powered off. The device is configured to switch from a first mode to a second mode, following detection, wherein the first mode comprises a mode in which the first circuit is substantially powered on and the second circuit is substantially powered off, wherein the second mode comprises a mode in which the second circuit is substantially powered on and the first circuit is substantially powered off. The device includes a switch configured to switch from the first mode to the second mode in response to receipt of an instruction from a third circuit of the device. The device includes a switch configured to switch from the first mode to the second mode in response to receipt of an instruction from a processor external to the device. The sensor comprises an acoustic, piezoelectric transducer, a piezoelectric sensor, an acoustic transducer, an accelerometer, a chemical sensor, an ultrasonic sensor or a gyroscope. A detection criterion comprises an adjustable threshold. The adjustable threshold is adjustable by software or one or more software updates. The adjustable threshold comprises an adaptive threshold that is based on a specified or recorded noise level of a particular geographic area. A detection criteria specifies that an input pressure stimulus to the sensor reaches a threshold input level a certain number of times. The threshold input level is a threshold acoustic input level.

In another example, one or more machine-readable hardware storage devices comprise instructions that are executable by a device to perform one or more operations comprising: detecting when an input stimulus to a sensor satisfies one or more detection criteria; producing a signal upon detection that causes adjustment of performance of the device by causing a circuit of the device to increase power level, relative to a power level of the circuit prior to detection; and processing input to the device using the circuit with the increased power level. In this example, one or more machine-readable hardware storage devices comprise instructions to perform one or more of the features of the devices.

In another example, a method performed by a device includes detecting when an input stimulus to a sensor of a device satisfies one or more detection criteria; producing a signal upon detection that causes adjustment of performance of the device by causing a circuit of the device to increase power level, relative to a power level of the circuit prior to detection; and processing input to the device using the circuit with the increased power level. Other embodiments of this aspect include corresponding computer systems, apparatus, and computer programs recorded on one or more computer storage devices, each configured to perform the actions of the methods. In this example, the method further comprises performing one or more of the features of the devices.

In still another example, a device includes an acoustic transducer; and a first circuit banded over a frequency range and configured to detect when (i) an acoustic level of the acoustic transducer exceeds a threshold level, or (ii) when an average banded acoustic level for the acoustic transducer for a period of time exceeds the threshold level and is further configured to produce a first signal; wherein the first circuit is in a power mode that consumes less than 350 microwatts. Other embodiments of this aspect include corresponding computer systems, apparatus, and computer programs recorded on one or more computer storage devices, each configured to perform the features of the devices.

In this aspect, the device includes one or more of the following features and/or any combination thereof. The first circuit is configured to detect when the acoustic level of the acoustic transducer exceeds the threshold level comprises the first circuit being configured to detect when the acoustic level of the acoustic transducer exceeds the threshold level a certain number of times. The threshold level comprises a threshold acoustic level. The power mode consumes approximately 20 microwatts. Banded over the frequency range comprises banded from 10 Hz to 35 kHz. The threshold level is between 60 dB SPL and 90 dB SPL at a frequency in the banded frequency range. The threshold level is between 40 dB SPL and 110 dB SPL at a frequency in the banded frequency range. The acoustic transducer has a flat response in a voice frequency range in which the acoustic transducer is substantially equally sensitive to frequencies in the voice frequency range. The power mode that consumes less than 350 microwatts is a power mode of less than 200 microwatts. The power mode that consumes less than 350 microwatts is a power mode of less than 100 microwatts. The power mode that consumes less than 350 microwatts is a power mode of less than 50 microwatts. The device includes a second circuit configured to generate a second signal at least partly based on the first signal of the first circuit. The banded acoustic level is banded by the first circuit or banded at the first circuit in which the banding is done inside the first circuit. The first circuit banded over the frequency range comprises the acoustic transducer banded by mechanics of the acoustic transducer in which the acoustic transducer mechanically has a resonant frequency of the acoustic transducer such that the acoustic transducer does not sense frequencies outside the frequency range because such outside sensing is beyond mechanics of the acoustic transducer. Mechanics comprise mechanical or hardware capabilities. Banded by the first circuit comprises the first circuit being configured to only detect a certain acoustic range. The device comprises a packaged device with an acoustic filter before an input port of the packaged device or of the acoustic transducer to acoustically band the first circuit. The second circuit is further configured to transmit the second signal to a digital system to cause the digital system to power on and to perform digital signal processing (DSP). The frequency range comprises 300 Hz-5 kHz. The acoustic transducer comprises a piezoelectric acoustic transducer or a capacitive acoustic transducer. The first circuit comprises an analog circuit. The device comprises an analog device. The device is configured to operate at an analog level. The device comprises a packaged device.

In still another example, the device includes a sensor; and a first circuit banded over a frequency range and configured to detect when (i) a signal level of the sensor exceeds a threshold level, or (ii) when an average banded signal level of the sensor for a period of time exceeds the threshold level and is further configured to produce a first signal; wherein the first circuit is in a power mode that consumes less than 350 microwatts. Other embodiments of this aspect include corresponding computer systems, apparatus, methods and computer programs recorded on one or more computer storage devices, each configured to perform the features of the devices.

In this example, the device includes one or more of the following features and/or any combination thereof. The sensor comprises an acoustic, piezoelectric transducer, a piezoelectric sensor, an acoustic transducer, an accelerometer, a chemical sensor, an ultrasonic sensor or a gyroscope. The power mode consumes approximately 20 microwatts. The power mode that consumes less than 350 microwatts is a power mode of less than 200 microwatts. The power mode that consumes less than 350 microwatts is a power mode of less than 100 microwatts. The power mode that consumes less than 350 microwatts is a power mode of less than 50 microwatts. The device includes a second circuit configured to generate a second signal at least partly based on the first signal of the first circuit. The banded frequency range comprises a limit at the signal level. The banded frequency range is banded by the first circuit or banded at the first circuit in which the banding is done inside the first circuit. Banded over the frequency range comprises banded by mechanics of the sensor in which the first circuit mechanically has a resonant frequency of the sensor such that the first circuit does not sense frequencies outside the frequency range because such outside sensing is beyond mechanics of the sensor. Mechanics comprise mechanical or hardware capabilities. Banded by the first circuit comprises the first circuit being configured to only detect a certain signal range. The device comprises a packaged device with a signal filter before an input port of the packaged device to band the first circuit. The second circuit is further configured to transmit the second signal to a digital system to cause the digital system to power on and to perform digital signal processing (DSP). The frequency range comprises 300 Hz-5 kHz. The first circuit comprises an analog circuit. The device comprises an analog device. The device is configured to operate at an analog level. The device comprises a packaged device. The first circuit configured to detect when the signal level of the sensor exceeds the threshold level comprises the first circuit being configured to detect when the signal level of the sensor exceeds the threshold level a certain number of times. The threshold level is a threshold acoustic input level.

DETAILED DESCRIPTION

Piezoelectric Micro Electro-Mechanical Systems (MEMS) devices have an inherent ability to be actuated by stimulus even in the absence of a bias voltage for the transducer due to the piezoelectric effect of the material used to realize the transducer, e.g., AlN, PZT, etc. This physical property enables piezoelectric MEMS devices to provide ultra-low power detection of a wide range of stimulus signals, and provide deeper integration of the detection electronics within an application-specific integrated circuit (ASIC) without requiring specialized electronics at the system level or add-on blocks that do not optimize the power performance of the transducer.

MEMS capacitive microphones require a charge pump to provide a polarization voltage to the back-plate. Charge pumps require a clock and storage capacitors to store charge that is pumped onto the back-plate. Multiple stages are required to boost the polarization voltage to required levels. When initially turned on, time is required to achieve desired levels based on clock frequency, storage capacitor size, and available supply voltage.

Piezoelectric MEMS devices do not require a charge pump. Furthermore, the charge generated by the piezoelectric effect is always being generated due to stimulus causing mechanical stress. As a result, ultra low power circuits can be utilized to transfer this charge to a voltage and provide an output relative to the mechanical stress induced on the Piezoelectric MEMS device through simple gain circuits. Higher voltages are not required to achieve higher transducer sensitivity.

One particular application, utilizing Piezoelectric MEMS Microphones and taking advantage of this effect, is a circuit that will produce a signal based on a prescribed minimum acoustic input level indicating an acoustic stimulus was detected. This signal could be further utilized by the system and/or microphone to perform further actions, i.e., mode to a higher performance state, turn on other components within the system, begin a digital acquisition to further investigate the acoustic stimulus and identify its components.

Figure 2A:
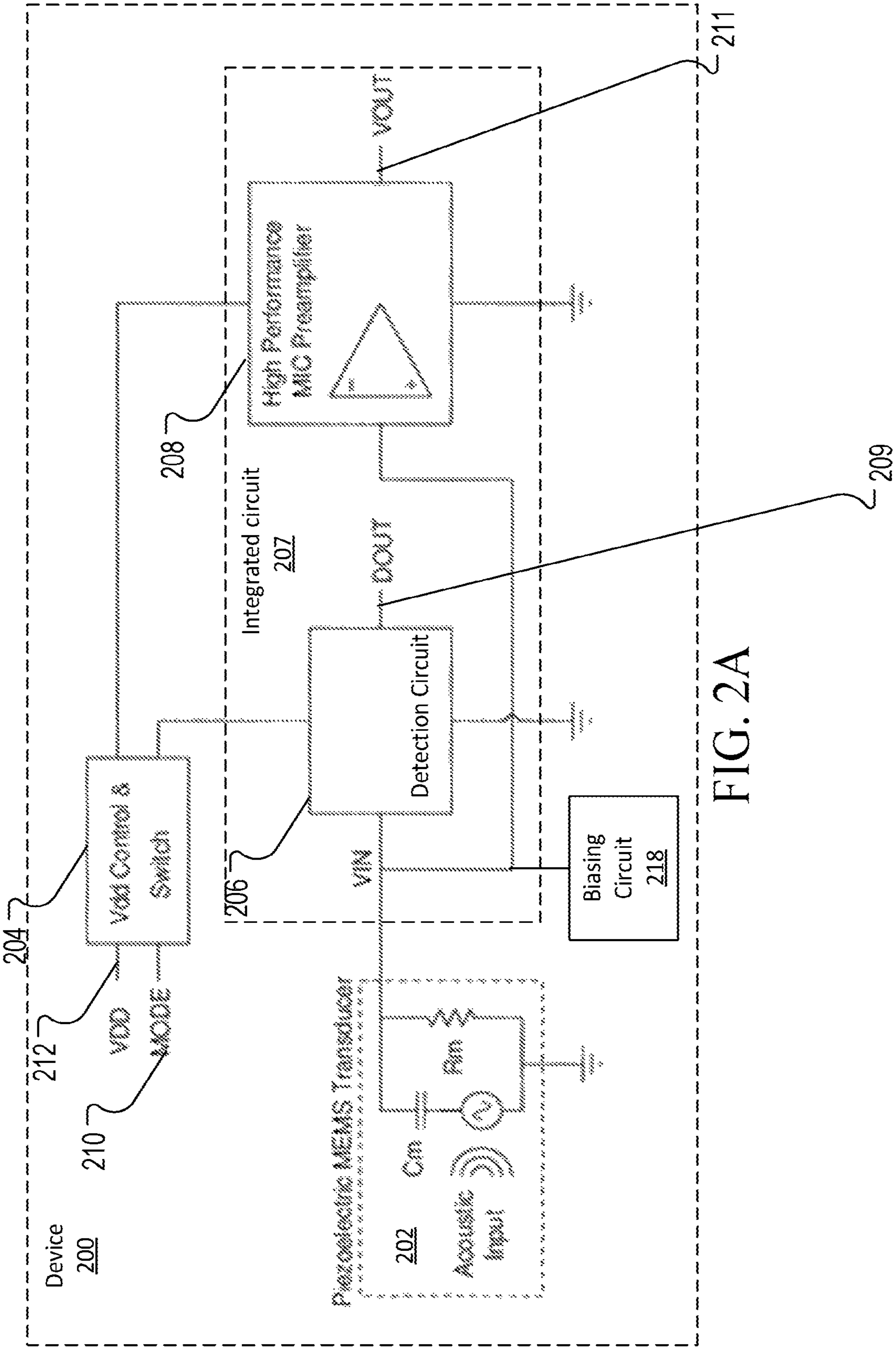
FIGS. 2A-2C are each a diagram of a device.
Figure 2B:
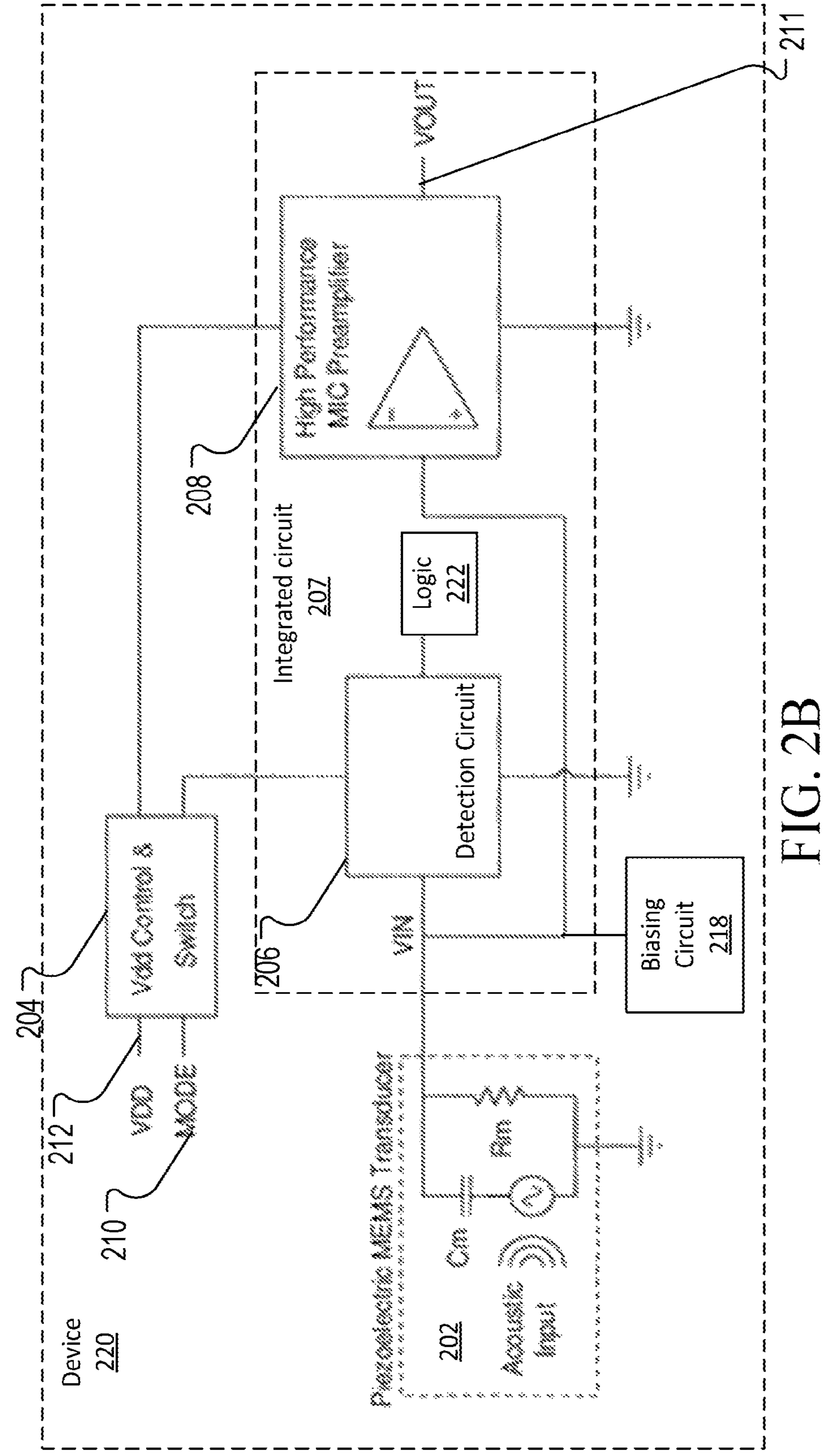

In an example, detection circuit of an acoustic device, such as a microphone, interfaces to a logic circuit that is part of the acoustic device (as shown in FIG. 2B), rather than the acoustic device including a detection pin that allows an application processor to perform the logic (as shown in FIGS. 2A and 5). The detection circuit is designed to indicate when an input pressure stimulus reached a prescribed level. The detection circuit triggers a digital state machine indicating that a signal was heard. The state machine modes the microphone ASIC to a higher performance state. Due to the inherent startup advantages of piezoelectric microphones, this state is achieved instantly. The digital state machine can also signal the system to exit from sleep mode, if the system were capable of a sleep mode, and be prepared to process the signal further. The microphone would contain the logic necessary to determine the ambient acoustic environment and make a decision on which action to take for further processing of the sensed acoustic environment.

In another example, the logic required on the microphone ASIC is simplified, pushing the decision making logic of the ambient acoustic environment to the application processor, as shown in FIGS. 2A and 5. The microphone ASIC then simply realizes a detection circuit, with a detection level set to an acoustic input level. The ASIC then latches an acoustic event that crossed this threshold, signaling the system, and allowing the system to mode the ASIC into a high performance state for detailed interrogation of the ambient acoustic environment. The ASIC would realize this functionality by having a dedicated input to control which mode it is in, and a dedicated digital output that signals the system when the microphone is in wake on sound mode and an acoustic stimulus has crossed the detection threshold. Generally, wake on sound includes a mode or a configuration of a device (such as a microphone, acoustic device, acoustic transducer, acoustic, piezoelectric transducer, piezoelectric device. MEMS microphone and so forth) in which the device adjusts or transitions among states, modes or actions in response to detection of satisfaction of a threshold input stimulus, e.g., an audio input at or above a threshold level. In another example, wake on sound includes a mode in which a device (e.g., including an acoustic transducer and/or an integrated circuit) is configured to detect an acoustic stimulus or detection of satisfaction of one or more criteria and is further configured to perform one or more actions or transition among modes or states upon the detection.

Figure 1:
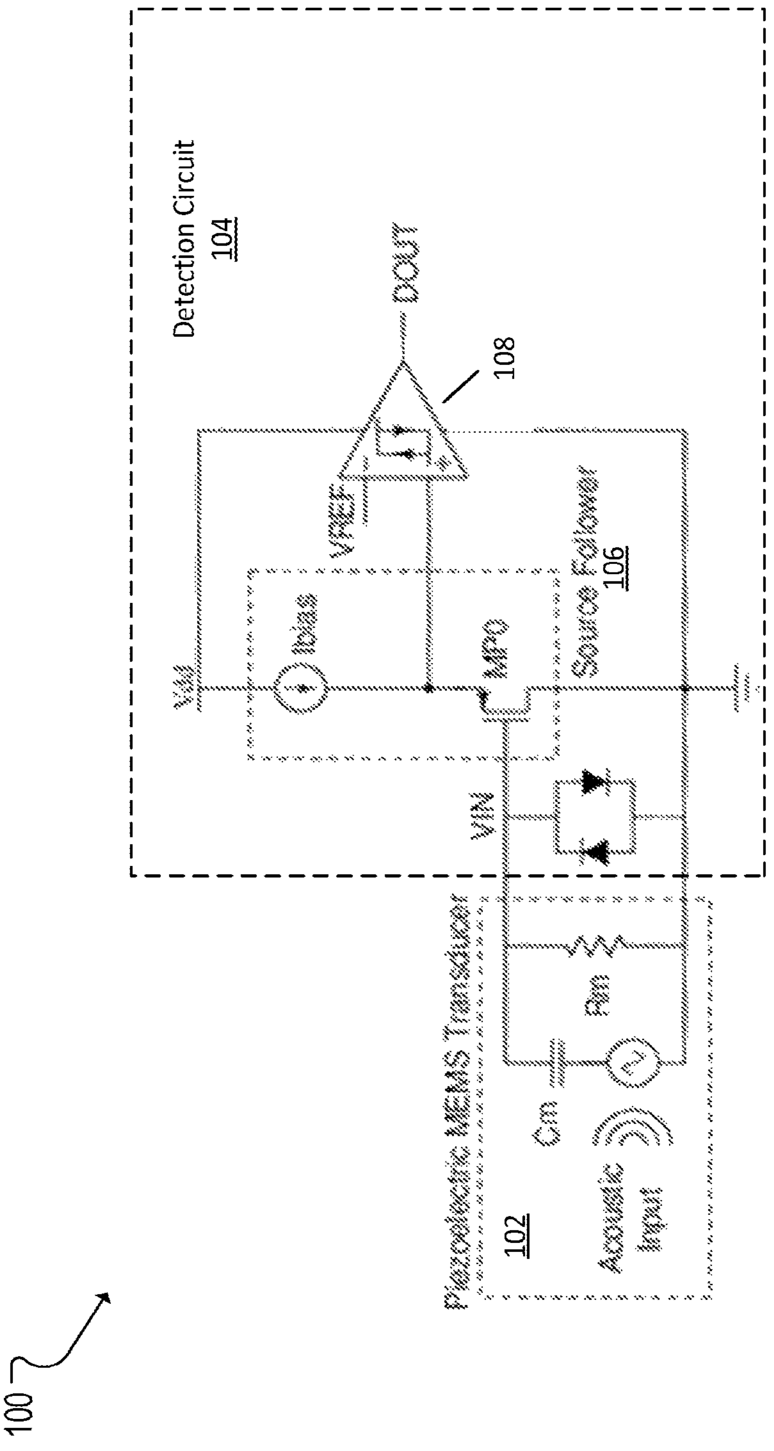
FIG. 1 is a diagram of a circuit.

Referring to FIG. 1, circuit 100 includes transducer 102 and detector circuit 104. Source follower stage 106 transforms the charge generated by transducer 102 and provides gain for the next stage (e.g., a latched comparator stage). The second stage is a latched comparator 108, which compares the output of the source follower 106 to a reference voltage that is designed to target a specific minimum acoustic input sound pressure level (SPL). Once this level has been sensed, the latched comparator 108, latches the event, and provides a signal indicating such. The latch uses positive feedback to effectively act as a memory cell. Once power is removed from the latch, the information that was latched is cleared or lost, while memory, e.g., static random access memory (SRAM), retains the information even with the power removed. As described in further detail below, this provided signal is output to a detection pin that alerts an external system of detection of the SPL. This signal can be further used to control/trigger other events within the application specific integrated circuit (ASIC) or within the overall system by driving this signal off chip. In a variation, latched comparator 108 is configured to detect when the acoustic input (or VIN) satisfies one or more specified criteria. There are various types of criteria that the detection circuit can be configured to detect. These criteria include, e.g., voice criteria (detection of voice), keyword criteria (e.g., detection of keywords), ultrasonic criteria (e.g., detection of ultrasonic activity in proximity to our surrounding the transducer or acoustic device), criteria of detecting footsteps, mechanical vibrations/resonances, gunshots, breaking glass, and so forth.

In this example, a bandwidth of the preamplifier stage (e.g., implemented by the preamplifier) determines a spectrum of input signals that trigger the comparator stage implemented by latched comparator 108. Ultra-Low Power electronics typically have bandwidths still acceptable for the audio range. Also, impulse acoustic events trigger a broad spectrum increase in energy, acceptable for triggering with the comparator.

Further processing to discriminate specific frequency and frequency bands is implemented as well providing the ability detect specific acoustic signatures, i.e., command words, acoustic signals, at ultra low power (due to the external audio-subsystem being powered down, as described in further detail below). Multiple devices (configured for wake on sound mode) could also be implemented as an array. In this example, the DOUT/VOUT signals are processed providing the ability to perform directionality measurement, beam-forming, beam-steering, proximity detection, and Signal-to-Noise improvement.

Referring to FIG. 2A, device 200 implements wake on sound in a configurable mode. In this example, device 200 includes an acoustic device. Device 200 includes switch 204, transducer 202, detection circuit 206, integrated circuit ("IC") 207 (hereinafter "IC" 207) and preamplifier 208. In a variation, IC 207 includes gain circuitry, an amplifier or another circuit, rather than preamplifier 208.

In this example, preamplifier 208 is configured to process audio input in an operational mode and is further configured to be powered on, following detection of one or more of the specified criteria. Switch 204 is configured to switch device 200 between a first mode (e.g., a wake on sound mode) and a second mode (e.g., a normal or operational mode), e.g., in response to receipt of an instruction from a processor external to device 200. Switch 204 includes pins 210, 212. Generally, a pin includes a pad (e.g., that is attached or mounted to a circuit). Pin 210 is a mode pin and is a dedicated input for controlling the mode of device 200. Pin 212 is a voltage drain (VDD) pin that inputs the VDD of device 200 into switch 204. In this example, an external system (e.g., such as processor 512 in FIG. 5A) controls the mode of operation of device 200 by transmitting a mode signal that sets (on mode pin 210) mode=1 (i.e., mode=VDD), which causes device 200 to transition to wake on sound mode in which detection circuit 206 is powered on, e.g., by routing VDD to detection circuit 206. In this example, pin 210 includes a pad configured to receive, from an external processor, a signal that causes device 200 to switch from a first mode (e.g., a wake on sound mode) to a second mode (e.g., an operational mode). In this example, the first mode includes a mode in which detection circuit 206 is substantially powered on and preamplifier 208 is substantially powered off (e.g., entirely powered of or a state in which a minimum amount of power is consumed). In this example, the second mode includes a mode in which preamplifier 208 is substantially powered on and detection circuit 206 is substantially powered off. In this example, device 200 is configured to switch from the first mode to the second mode, upon detection that the input audio satisfies one or more criteria.

When mode pin 210 is set to equal 0 (via the mode signal), device 200 operates in operational mode (e.g., a normal mode) in which detection circuit 206 is powered down (or substantially powered down) and preamplifier is powered on (or is substantially powered on) by routing VDD to preamplifier 208. That is, a voltage equal to VDD modes IC 207 into the wake on sound mode, while a floating or low signal modes IC 207 into normal operation. The mode signal is buffered, and further controls power switch 204 which routes VDD to either the high performance circuitry (e.g., preamplifier 208) or the wake on sound circuitry (e.g., detection circuitry 206). The mode signal also configures input biasing circuitry (e.g., biasing circuit 218) to control switches (included in the input biasing circuitry), which properly configure the input biasing network and switch for transducer 202.

In this example, transducer 202 receives acoustic input and transducer 202 converts that acoustic input into an input voltage (VIN). Detection circuit 206 detects when one or more criteria are satisfied by the acoustic input. In this example, detection circuit 206 is configured to operate substantially around 5 micro Amps. For example, detection circuit 206 detects when VIN equals a threshold voltage or a reference voltage (VREF), such e.g., VIN=VREF. Upon detection of satisfaction of one or more of the detection criteria, detection circuit 206 produces a signal that causes detect pin 209 to go "high" (e.g., have a value equal to one). There are various types of detection criteria. In an example, detection criterion comprises an adjustable threshold. The adjustable threshold is adjustable by software or one or more software updates and/or by one or more circuit configures and/or settings. In one example, the adjustable threshold comprises an adaptive threshold that is based on a specified or recorded noise level of a particular geographic area.

In this example, detect pin 209 includes a pad configured to transmit, to an external processor, a signal that specifies that the acoustic input stimulus to transducer 202 satisfies at least one of one or more detection criteria. There are various types of acoustic input stimulus, including, e.g., sound, pressure, and so forth. An external processor or system (e.g., processor 512 in FIG. 5A) receives this signal from detect pin 209. In response to this signal, the external processor powers on or powers up to an increased power level (relative to a power level before the processor received this signal), as described in further detail below. Additionally, in response to the signal, the processor sets the mode pin 210 to a low value to cause device 200 to transition from wake on sound mode to operational mode. In this example, device 200 is configured to receive a signal from a processor external to device 200, with the signal being for powering off detection circuit 206 and for powering on preamplifier 208. In another example, device 200 is configured to receive a signal from a processor external to the device, with the signal being for reducing a power level of detection circuit 206, relative to a power level of detection circuit 206 prior to detection, and with the signal further being for increasing a power level of preamplifier 208, relative to a power level of preamplifier 208 prior to detection.

In operational mode, another circuit in IC 207 (such as preamplifier 208) increases its power level of the second circuit, relative to a power level of the other circuit prior to detection. For example, in operational mode, preamplifier 208 is configured to operate in a range of 100-300 micro Amps. In this example, the signal generated by detection circuit 206 causes adjustment of performance of device 200 by causing an external processor to transmit an instruction to device 200 to increase a power level of a second circuit (e.g., preamplifier 208), relative to a power level of the second circuit prior to detection. In this example, preamplifier 208 is substantially powered off prior to detection. Once in operational mode, device 200 processes acoustic input 202 and outputs VOUT (e.g., pin 211) to an external processor or system for application processing. In this example. VOUT represents an output voltage that is based on voltage amplification of the acoustic input.

In a variation of FIG. 2A, device 200 is a packaged device for mounting on a substrate or another circuit. The packaged device includes a substrate for mounting the acoustic, piezoelectric transducer 202, detection circuit 208 and preamplifier 208 (or any other type of circuitry). The packaged device includes a housing portion for covering the substrate on which the transducer 202, detection circuit 208 and preamplifier 208 (or any other type of circuitry) are mounted.

Referring to FIG. 2B, device 220 is a variation of device 200. Device 220 includes logic circuit 222 (hereinafter "logic 222"), e.g., rather than including detection pin 209. In this example, detection circuit 206 is configured to produce a signal, when the acoustic input satisfies one or more criteria (which are programmed into the detection circuit or which are accessible or readable by the detection circuit). In this example, logic 222 is configured to implement a digital state machine. Detection circuit 206 transmits to logic 222 the signal (that indicates the detection) to trigger digital state machine. The state machine (in logic 222) modes IC 207 to a higher performance state, e.g., by powering on preamplifier 208 and by powering off detection 206. That is, logic 222 is configured for reducing a power level of detection circuit 200, relative to a power level of detection circuit 206 prior to detection, and for increasing a power level of preamplifier 208, relative to a power level of preamplifier 208 prior to detection. Logic 222 includes configurable logic and/or software that is configurable to perform one or more specified operations.

Logic 222 instructs switch 204 to switch modes by transmitting a switching signal to switch 210 that causes mode pin 210 to go high or low. That is, switch 204 is configured to switch from a first mode (e.g., a wake on sound mode) to a second mode (e.g., an operation mode) in response to receipt of an instruction from logic 222 of device 220. The digital state machine also signals a system (e.g., external processor 512 in FIG. 5A) to exit from sleep mode, if the system were capable of a sleep mode, and be prepared to process the signal further. In this example, device 220 itself includes logic 222 for analyzing the ambient acoustic environment and making a decision on which action to take for further processing of the sensed acoustic environment (e.g., by deciding whether to operate in wake on sound mode or in operational mode).

Figure 2C:
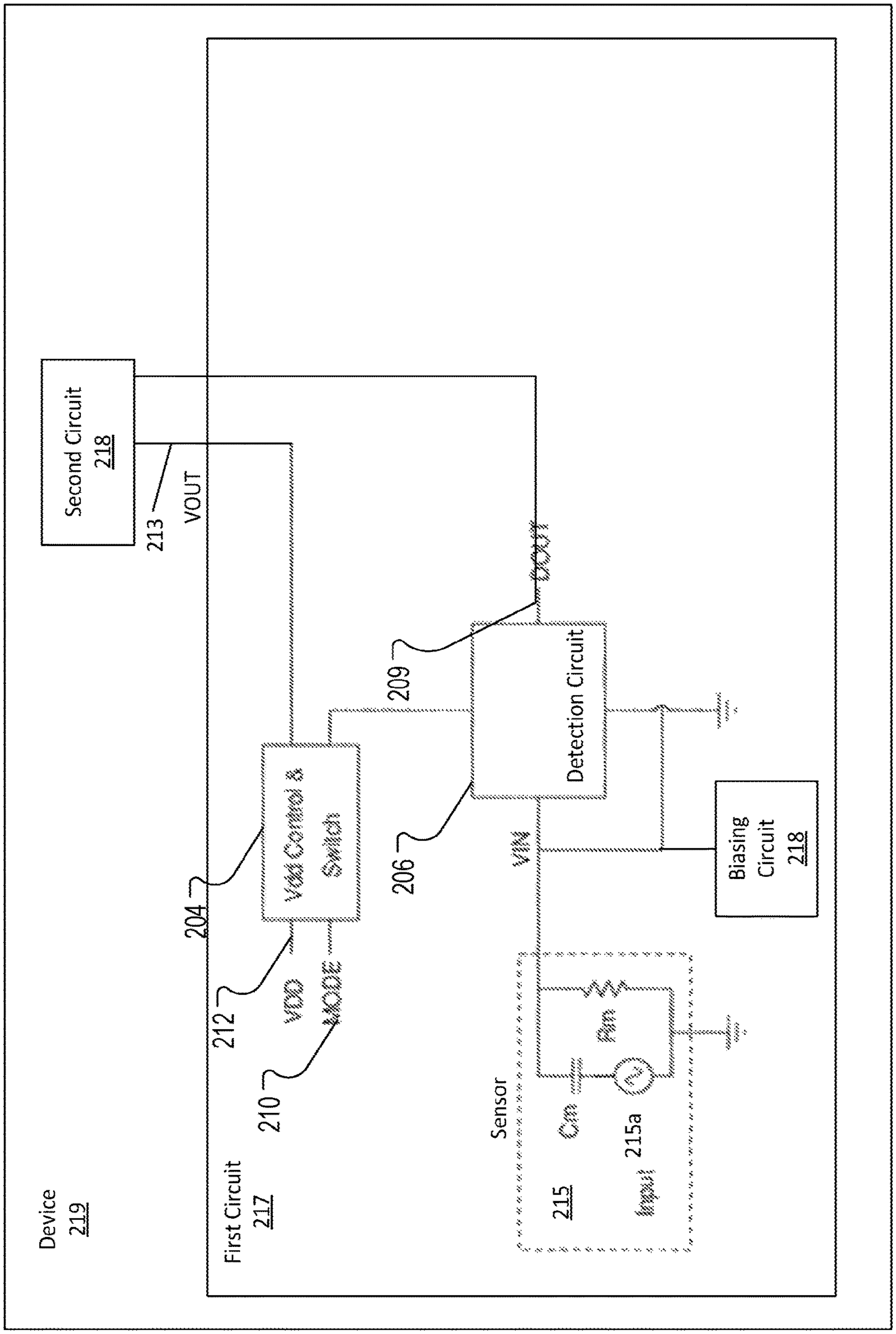

Referring to FIG. 2C, a variation of FIG. 2A is shown. In this variation, device 219 (e.g., a speaker, a smart speaker device, a smart speaker case, etc.) includes first circuit 217 and second circuit 218 (e.g., include one or more microphones (e.g., in a smart speaker case), a DSP chip, etc.). In this example, second circuit 218 includes circuitry that is turned on by first circuit 217. In this example, second circuit 218 includes a circuit that is in hibernation or that is powered down. In this example, when second circuit 218 is turned on, second circuit 218 transitions from a lower power state to a higher power state (relative to the power state of the lower power state). In this example, first circuit 217 is configured to mode or turn on all of second circuit 218 or one or more portions of second circuit 218. In this example, first circuit 217 includes sensor 215 for sensing, detecting or receiving sensed input 215*a*, e.g., detecting motion. Detection circuit 206, biasing circuit 218 and switch 204 each are configured to substantially operate as previously described with regard to FIG. 2A. In this example, the first circuit is configured to operate at substantially 8 microAmps. The second circuit is configured to operate using 20-350 microAmps.

For example, switch 204 is configured to switch first circuit 217 between a first mode (e.g., a wake on sensed input mode) and a second mode (e.g., a normal or operational mode). Generally, a wake on sensed input mode includes a mode or a configuration of a device in which the device adjusts or transitions among states, modes or actions in response to detection of satisfaction of a threshold input stimulus that is sensed by a sensor.

In this example, pin 210 is a mode pin and is a dedicated input for controlling the mode of first circuit 217. Pin 212 is a voltage drain (VDD) pin that inputs the VDD of first circuit 217 into switch 204. In this example, device 219 (or second circuit 218) controls the mode of operation of first circuit 217 by transmitting a mode signal that sets (on mode pin 210) mode=1 (i.e., mode=VDD), which causes first circuit 217 to transition to wake on sensed input mode in which detection circuit 206 is powered on, e.g., by routing VDD to detection circuit 206. In this example, pin 210 includes a pad configured to receive, from an external processor, a signal that causes first circuit 217 to switch from a first mode (e.g., a wake on sensed input mode) to a second mode (e.g., an operational mode). In this example, the first mode includes a mode in which detection circuit 206 is substantially powered on. In this example, the second mode includes a mode in which detection circuit 206 is substantially powered off. In this example, first circuit 217 is configured to switch from the first mode to the second mode, upon detection that the input satisfies one or more criteria.

When mode pin 210 is set to equal 0 (via the mode signal), first circuit 217 operates in operational mode (e.g., a normal mode) in which detection circuit 206 is powered down (or substantially powered down). That is, a voltage equal to VDD modes detection circuit 206 into the wake on sensed input mode, while a floating or low signal modes detection circuit 206 into normal operation. The mode signal also configures input biasing circuitry (e.g., biasing circuit 218) to control switches (included in the input biasing circuitry), which properly configure the input biasing network and switch for sensor 215.

In this example, sensor 215 receives input 215*a* and sensor 215 converts that input into an input voltage (VIN). Detection circuit 206 detects when one or more criteria are satisfied by the input. In this example, detection circuit 206 is configured to operate substantially around 5 micro Amps. For example, detection circuit 206 detects when VIN equals a threshold voltage or a reference voltage (VREF), such e.g., VIN=VREF. Upon detection of satisfaction of one or more of the detection criteria, detection circuit 206 produces a signal that causes detect pin 209 to go "high" (e.g., have a value equal to one). In this example, detect pin 209 includes a pad configured to transmit, to second circuit 218, a signal that specifies that the input 215*a* to sensor 215 satisfies at least one of one or more detection criteria. There are various types of input stimulus, including, e.g., pressure, movement and so forth. An external processor or system (e.g., second circuit 218) receives this signal from detect pin 209. In response to this signal, the external processor powers on or powers up to an increased power level (relative to a power level before the processor received this signal) or performs one or more specified actions (e.g., turning on a light). Additionally, in response to the signal, device 219 (or second circuit 218 or even another circuit within device 219) sets the mode pin 210 to a low value to cause first circuit 217 to transition from wake on sensed input mode to operational mode. In this example, first circuit 217 is configured to receive a signal from a processor external to first circuit 217, with the signal being for powering off detection circuit 206. In another example, first circuit 217 is configured to receive a signal from a processor (e.g., device 219) external to first circuit 217, with the signal being for reducing a power level of detection circuit 206, relative to a power level of detection circuit 206 prior to detection.

Once in operational mode, first circuit 217 processes input 215*a* and outputs VOUT (e.g., pin 213) to second circuit 218 in device 219 for application processing. In an example, second circuit 218 includes an external processor or subsystem. In this example, VOUT represents an output voltage that is based on processing of input 215*a*. In a variation, pin 213 is optional (e.g., making VOUT optional).

Figure 3A:
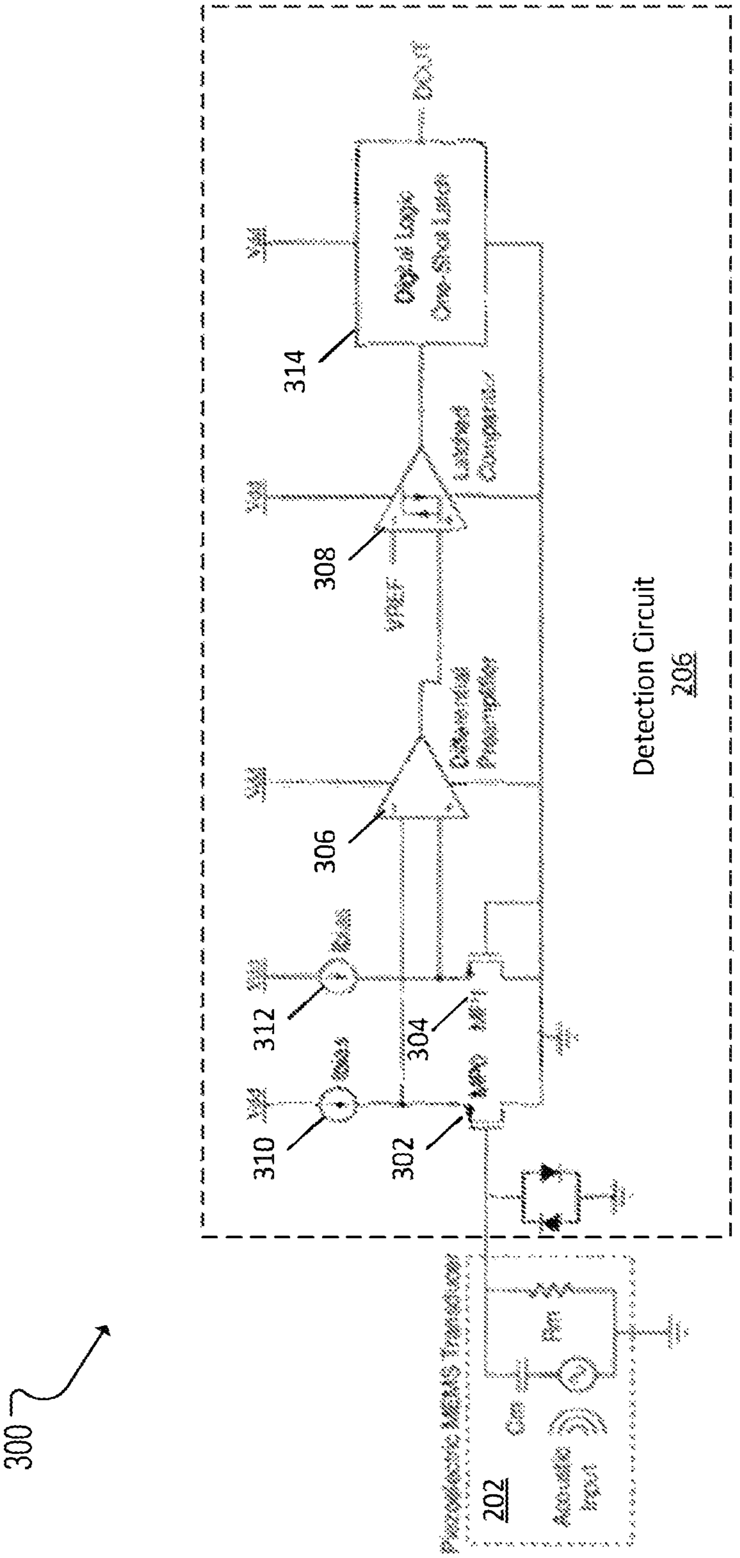
FIGS. 3A, 3B, 5A and 6 are each an architecture diagram.

Referring to FIG. 3A, architecture diagram 300 shows transducer and detection circuit 200. For wake on sound mode, transducer 202, as well as switch 204 (FIG. 2A) is biased (via biasing elements 310, 312) to a source voltage (VSS) of a circuit on which device 200 is connected. Two PMOS source follower circuits 302, 304 are used to buffer the signal received from transducer 202, as well as a VSS reference, to the input of a differential preamplifier 306. The differential preamplifier 306 is biased to provide approximately 60 dBV of gain to the signal from transducer 202. The startup switch timing is configured, by extending the reset time of the switch while in wake on sound mode, to stabilize the DC level of the source followers feeding the input to the differential preamplifier.

The output of the preamplifier 306 is routed to the input of a latched comparator 308 that is configured to determine whether the acoustic input satisfies one or more detection criteria. The reference side of the comparator is set to a voltage level scaled proportionately to the minimal acoustic detection threshold.

Once triggered (e.g., by detecting that the acoustic input satisfies one or more detection criteria), the latched comparator 308 latches the output to a high voltage level. This signal is further processed with a D-Latch circuit 314, which acts as a one-shot latch. The ASIC (e.g., IC 207) needs to be commanded, through the mode signal, out of the *Wake on Sound* mode to clear this signal. The latched signal, DOUT, is output from the ASIC for processing by the system.

Figure 3B:
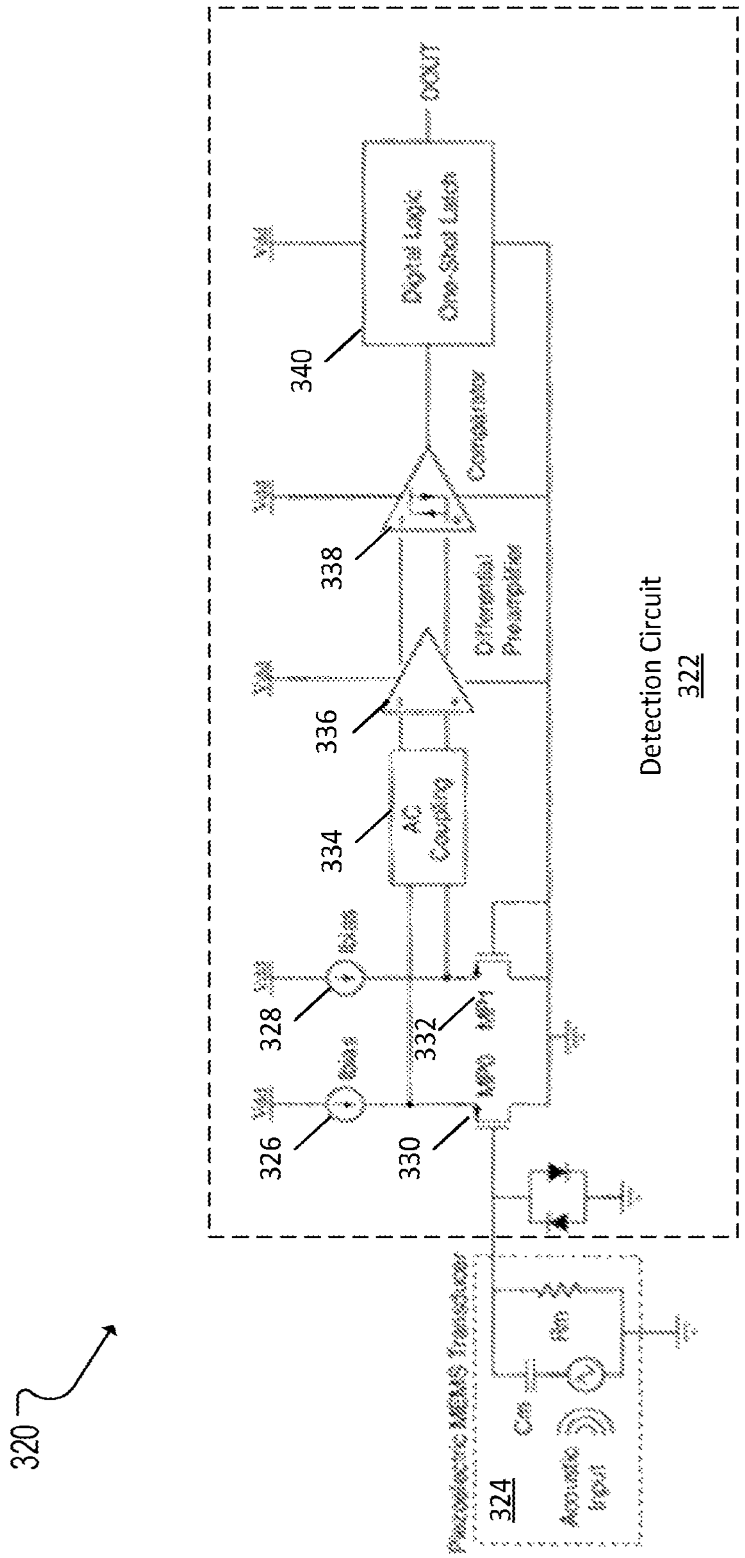

Referring to FIG. 3B, architecture diagram 320 shows transducer 324 and detection circuit 322. In an example, detection circuit 322 is a same detection circuit as detection circuit 206 in FIG. 2A. For wake on sound mode, transducer 324, as well as switch 204 (FIG. 2A), is biased (via biasing elements 326, 328 to a source voltage (VSS) of a circuit on which device 200 is connected. Two PMOS source follower circuits 330, 332 are used to buffer the signal received from transducer 324, as well as a VSS reference, to the input of an AC Coupling Circuit 334, allowing the signals to be re-biased to a preferred common mode voltage, increasing (e.g., maximizing) dynamic range of the differential preamplifier 336. The differential preamplifier 336 is biased to provide approximately 60 dBV of gain to the signal from transducer 324.

The output of the preamplifier 336 is routed to the input of a differential comparator 338 that is configured to determine whether the acoustic input satisfies one or more detection criteria. The comparator 338 is designed with hysteresis, and this hysteresis level, in coordination with the gain of the differential preamplifier 336 determines the detection criteria.

Once triggered (e.g., by detecting that the acoustic input satisfies one or more detection criteria), the comparator 338 latches the output to a high voltage level. This signal is further processed with a D-Latch circuit 340, which acts as a one-shot latch. The ASIC (e.g., IC 207 in FIG. 2A) needs to be commanded, through the mode signal, out of the wake on sound mode to clear this signal. The latched signal, DOUT, is output from the ASIC for processing by a system, Reference Voltage Level Determination:

This voltage level is set by the scale factor of the MEMS as well as the attenuation of the source follower and the gain of the differential preamplifier.

The following equation equates a reference voltage (VREF), a scale factor (SF) of the transducer, an attenuation (Atten) of the source follower, and a gain of the preamplifier (AV), to a specified (e.g., minimum) detectable acoustic threshold (Pa):

$$Pa_{Min.\ Threshold} = \frac{VREF}{SF * Atten * AV}$$

There is a tradeoff between each of the gain elements and the minimum detectable acoustic threshold. Increasing the gain of the preamplifier or scale factor of the MEMS, will provide the ability to detect very quiet signals, however this needs to be balanced with the headroom available due to VDD. If louder acoustic signals are desired to trigger the detection circuit, then gain needs to be removed from the circuit, or VREF increased.

Figure 4A:
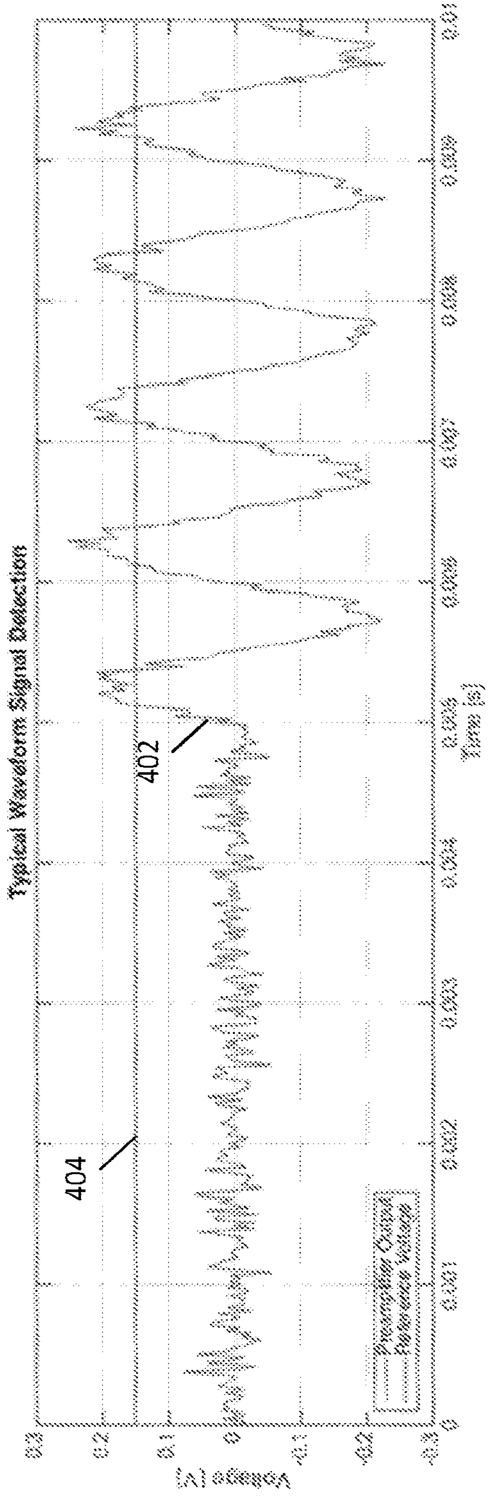
FIGS. 4A and 4B are each a diagram of results of operation of a device.

Example Waveforms:

Referring to FIG. 4A, diagram 400 illustrates results of operation of a device configured for wake of sound. Representation 402 represents a signal (e.g., a noisy, ambient acoustic signal) that has been processed by the transducer and preamplifier. At time 5 ms, a 1 kHz acoustic stimulus is sensed by the transducer, resulting in the waveform shown. In this example, representation 402 represents an acoustic stimulus. This acoustic stimulus, processed by the transducer and preamplifier, crosses the reference voltage line 404 a little after 5 ms.

Figure 4B:
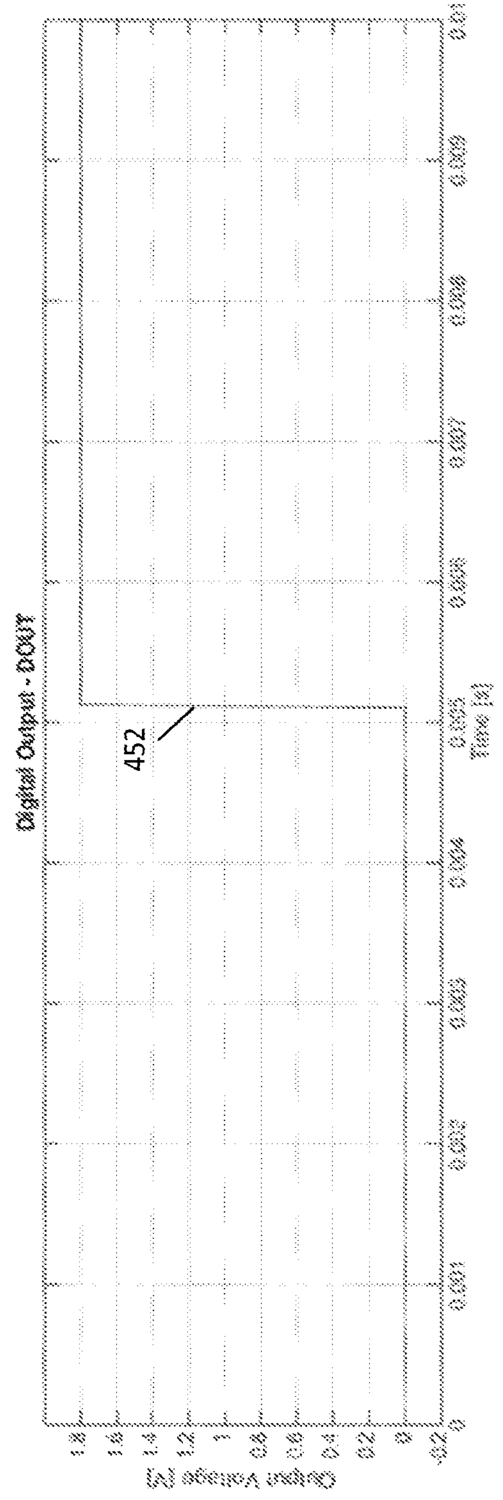

Referring to FIG. 4B, diagram 452 illustrates representation 452 of digital output signal over time. In this example, digital output is the digital output of a detection circuit that is processing the signal represented by representation 402. As shown by diagram 452, the digital output transitions from low to high, and remains high, e.g., once the signal represented by representation 402 exceeds the reference voltage. The system (e.g., external processor 512 in FIG. 5A) is required to process this transition, and clear the signal by commanding the device from wake on sound mode, to normal operation mode. The system (e.g., external processor 512 in FIG. 5A) can then determine whether or not to put the microphone back into wake on sound mode depending on the resulting measurements taken of the ambient acoustic environment while in normal operation. For example, the system can monitor the acoustic signal (e.g., a voltage of the acoustic signal) and determine if the acoustic threshold in wake on sound mode would be exceeded. If the system does not measure an acoustic signal exceeding the threshold (e.g., an acoustic signal with a voltage exceeding a threshold voltage) for some period of time, such as 5 minutes, then the system can put the microphone back into wake on sound mode.

In another example, the system can put the microphone back into WOS mode very soon after the threshold is exceeded and use other microphone(s) to monitor the acoustic environment. The system can continuously reset the WOS microphone back to WOS mode and wait until it goes for some period of time, such as 5 minutes, without the threshold being exceeded. If the threshold is not exceeded for some period of time, the system can turn off the remaining microphones and enter the lower-power state.

Figure 6:
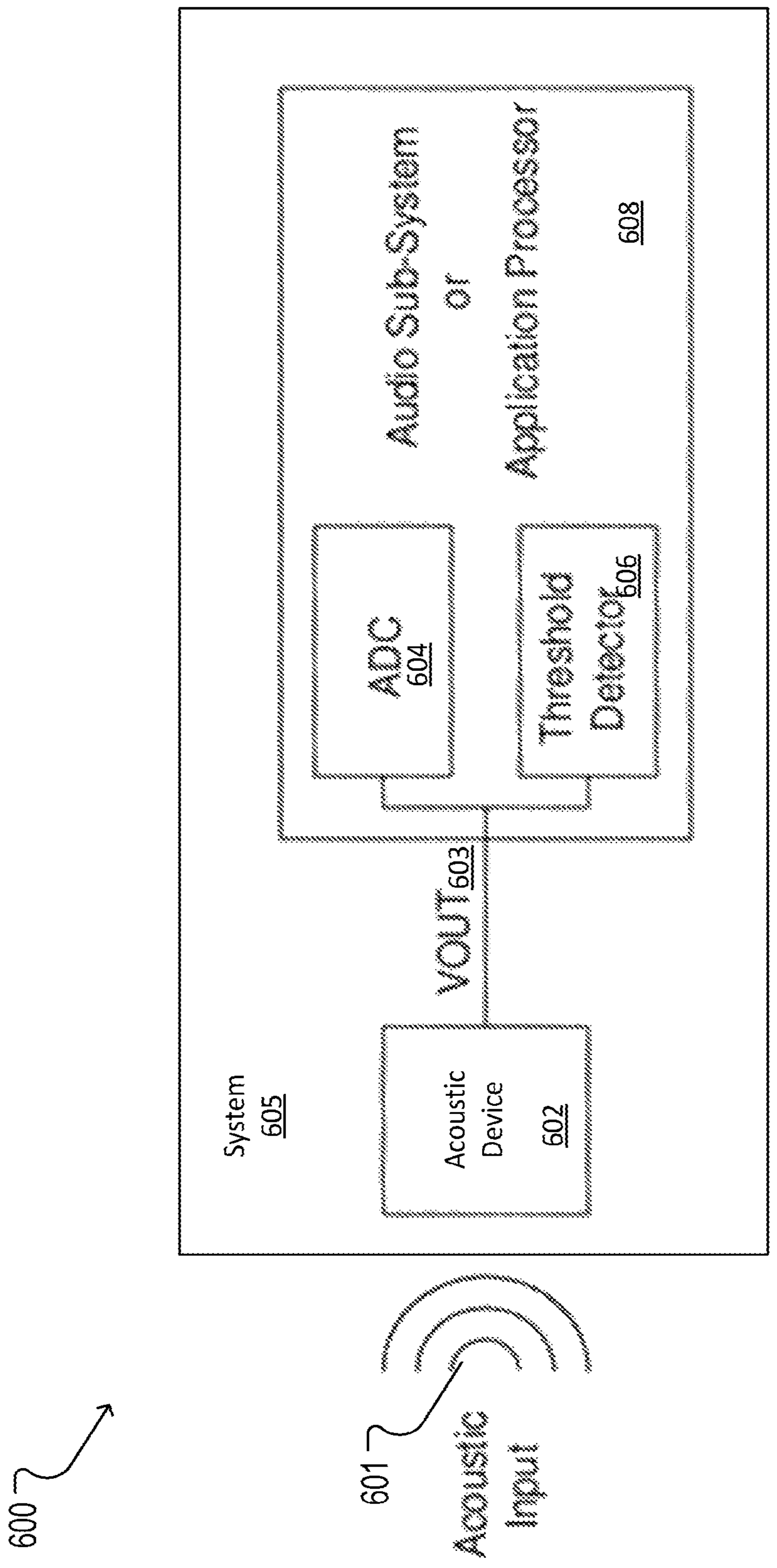

In an example, an acoustic threshold detection circuit occurs after the microphone in a system, e.g., as shown in FIG. 6. The circuit block would use the microphone output as its input where it could then detect low-level signals, and provide command and control outputs to the audio subsystem or application processor.

In another example, rather than placing the detection circuit after the microphone, detection is performed immediately after the transducer (e.g., by placing the detection circuit immediately after the transducer), providing for finer system command and control. For example, when a microphone or acoustic device is commanded into the wake on sound mode, it consumes only 5 uA of current, a 30× reduction in current consumption in normal mode operation, (150 uA) and provides a means of signaling the system to acoustic detection events, and has the capability of having its mode controlled by that system. As such, the entire audio subsystem could be powered down, saving considerable power when compared to other detection system architectures which would require some of the audio sub-system or application processor remain operational.

Based on the wake on sound architecture, the overall power consumption of the system is reduced, while providing for an acoustic stimulus to control overall system state, either sleep mode or active mode, with nearly zero power consumption. This circuitry, when realized directly off the transducer, increases the overall sensitivity of the microphone by nearly 60 dBV. Normal Operation, and the industry standard, specifies the sensitivity of the microphone at −38 dBV. In an example of a 1 Pa-RMS acoustic stimulus, the voltage output of the preamplifier would be approximately 12.5 mV-RMS. With the wake on sound mode enabled, the sensitivity of the microphone is increased to nearly +20 dBV (i.e., for a 1 Pa-RMS acoustic stimulus, the voltage output of the preamplifier would be approximately 10V-RMS) The voltage headroom will ultimately limit the maximum acoustic stimulus that can be sensed before saturating the electronics, but an assumption of operation is that the overall acoustic environment is quiet and filled with low-level signals.

Figure 5A:
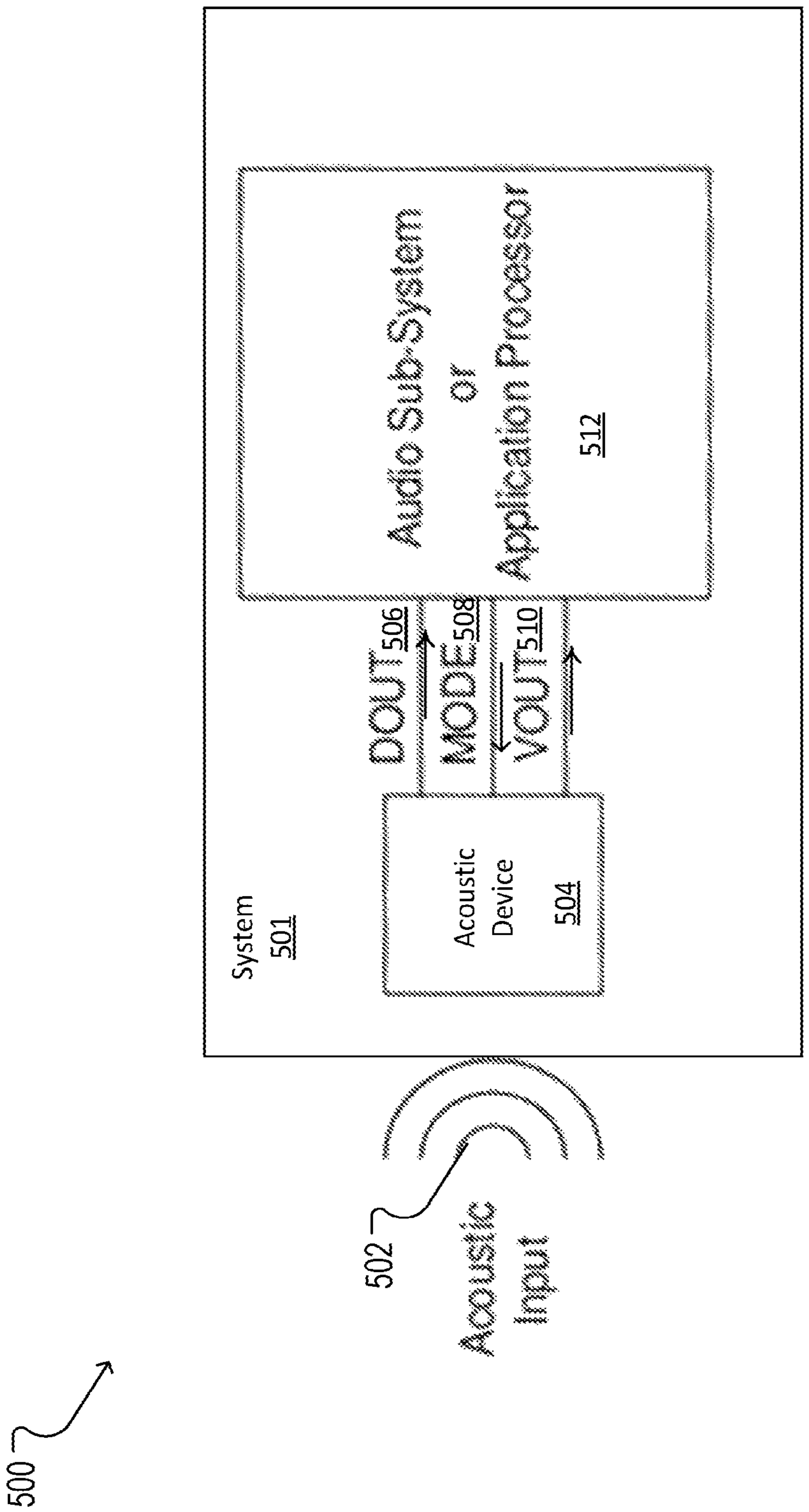

Referring to FIG. 5A, system architecture 500 is shown. In this example, system 501 includes acoustic device 504 and processor 512, which is external to acoustic device 504. In an example, acoustic device 504 includes device 200 (FIG. 2A) with an acoustic transducer, a detection circuit and a preamplifier. Acoustic device 504 receives acoustic input 502. In this example, acoustic device 504 includes detect pin 506 (e.g., which may be the same as detect pin 209), mode pin 508 (e.g., which may be the same as mode pin 210) and output voltage (VOUT) pin 510 (e.g., which may be the same as VOUT pin 211). Detect pin 506 is configured to indicate when acoustic input 502 equals or exceeds a threshold voltage (e.g., VREF). Mode pin 508 is configured to instruct acoustic device 504 to enter or to exit wake on sound mode. VOUT pin 510 specifies an output voltage (based on an acoustic input) from the acoustic transducer 504, for processing of the acoustic or audio input by processor 512. At a time prior to receipt of acoustic input, acoustic device 504 is powered on and processor 512 is powered off or in a "watchdog" or polling state in which processor 512 intermittently polls detect pin 506 for signals. Additionally, at this time, mode pin 508 is configured to wake on sound mode. Upon receipt of acoustic input 502 that is greater than or equal to the threshold voltage, detect pin 506 goes high (e.g., based on an output of a detection circuit in acoustic device 504). The logic of processor 512 in the watchdog state detects that detect pin 506 has gone high. In response, processor 512 powers on (e.g., processor 512 powers up) and sets mode pin 508 to be normal mode, thus causing acoustic device to transition out of wake on sound mode. By setting mode pin 508 to normal mode, device 504 is instructed (by processor 512) to power up the preamplifier (e.g., preamplifier 208 in FIG. 2) to enable acoustic device 504 to operate in "normal mode" and to power down the detection circuit (e.g., detection circuit 206) of acoustic device.

Figure 5B:
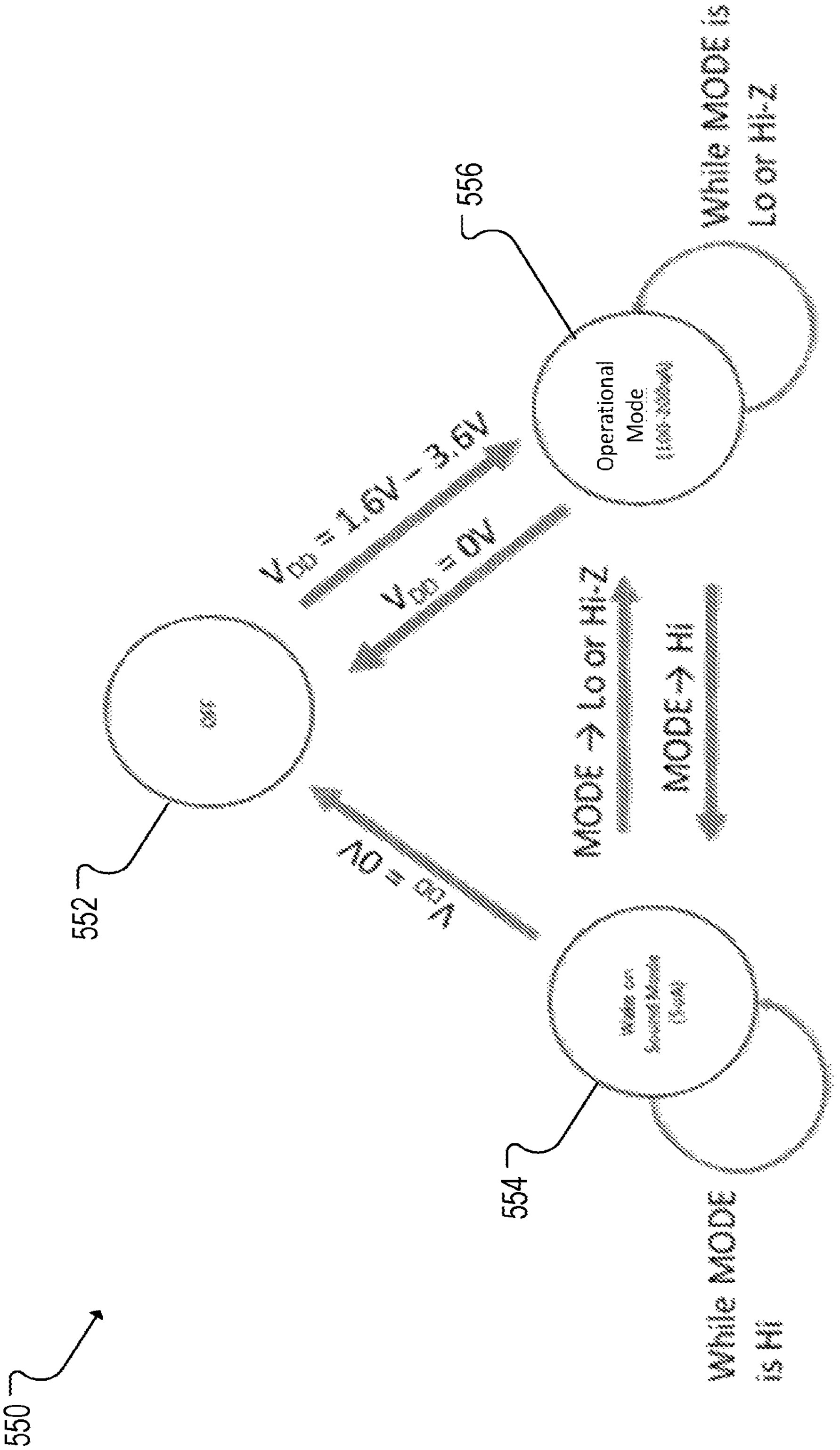
FIG. 5B is a moding diagram.

Referring to FIG. 5B, moding diagram 550 illustrates the modes of a chip and how the chip enters those modes. Node 552 represents a state in which the chip is off. Node 556 represents a state in which the chips operates in operational mode. In this example, the chip enters the operational mode when VDD has a voltage in a specified range (e.g., when VDD=1.6V-3.6V). The chip remains in operational mode while the mode is low or high impedance ("Hi-Z"), indicating that a signal that is "floating" or being driven by electronics that are powered "off." The chip transitions from operational mode to wake on sound mode (represented by node 554), when the mode goes high. The chip turns off when VDD has a low voltage or VDD=0V.

Referring to FIG. 6, another system architecture 600 is shown. In this example, system 605 includes acoustic transducer 602 and processor 608. Processor 608 includes analog-to-digital converter (ADC) 604 and threshold detector 606. In this example, threshold detector 606 is configured to detect when acoustic input 601 equals or exceeds a threshold level, e.g., by detecting when a voltage generated by the acoustic input equals or exceeds a threshold voltage. For example, threshold detector 606 is a detection circuit, e.g., such as detection circuit 206 (FIG. 2A). However, in this example, the detection circuit 606 is part of processor 608, rather than being included in acoustic device 602. Because detection circuit 606 is part of processor 608, rather than being included in acoustic device 602, processor 608 needs to remain powered on to detect the audio stimulus.

In this example, ADC 604 and threshold detector 606 need to remain on, from a time before acoustic input 601 is received. This is because acoustic device 602 does not include a detect pin (e.g., such as pin 506) to detect the audio stimulus and transmit to processor 608 a signal indicative of the detection. (Referring back to FIG. 5A, acoustic device 504 is able to perform this detection, rather than an external processor, because of the piezoelectric material in the transducer that produces a voltage without requiring a voltage source). In this example, the detection is performed by processor 608, e.g., by using ADC 604 to convert VOUT 603 (which is based on acoustic input) to digital data that can be processed by threshold detector 606. Because the detection is performed by processor 608, logic (i.e., ADC 604) and threshold detector 606 need to remain on to detect an acoustic stimulus. As a result, processor 608 cannot be powered down or residing in a polling state (as processor 512 in FIG. 5A can be). Additionally, because acoustic device 602 does not include a mode pin, acoustic device 602 cannot be configured to switch between a mode in which a detection device is powered on or another mode in which a preamplifier is powered on. Rather, in acoustic device 602, a preamplifier must remain on, and cannot be powered on an off via mode switching.

Figure 7:
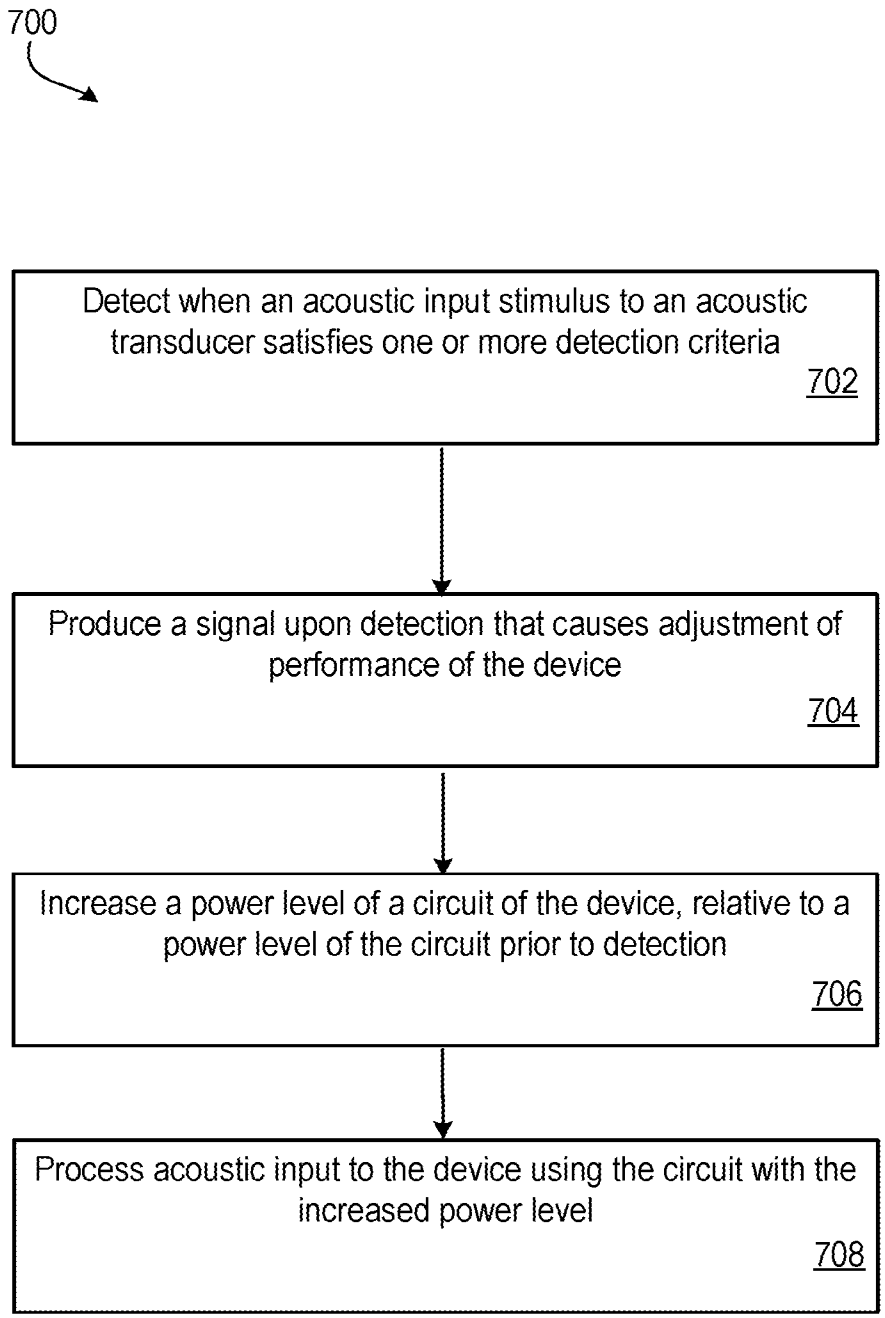
FIG. 7 is a flowchart of a process implemented by a device.

Referring to FIG. 7, process 700 is implemented by a device (e.g., device 200 in FIG. 2) in implementing one or more of the techniques described herein. In operation, device 200 (and/or detection circuit 206 in device 200) detects (702) when an acoustic input stimulus to acoustic transducer 202 of device 200 satisfies one or more detection criteria (e.g., that are retrieved by device 200 and/or that are programmed into device 200). Detection circuit 206 produces (704) a signal upon detection that causes adjustment of performance of device 200 by causing (706) a circuit (e.g., preamplifier 208) of device 200 to increase power level, relative to a power level of the circuit prior to detection. As described herein, the produced signal causes preamplifier 208 to increase its power level by causing an external system to detect the signal and in response to instruct device 200 to mode into operational mode. In another example, the produced signal causes preamplifier 208 to increase its power level by causing logic within device 200 to receive and/or to detect the signal and in response to instruct device 200 to mode into operational mode. Device 200 processes (708) acoustic input to device 200 using the circuit with the increased power level.

In an example, a device (as described herein) operates at a low power mode at the transducer level (when the device includes a transducer) and at the sensor level (when the device includes a sensor). For example, a low power mode includes consumption of less than 10 microAmps. In an example, a device includes an acoustic transducer; and a first circuit configured to detect when an acoustic level banded over (e.g., limited to) a frequency range exceeds a threshold level or when an average acoustic level for a plurality of acoustic levels that are each banded over the frequency range for a period of time exceeds the threshold level and is further configured to produce a first signal, e.g., when the acoustic level or the average acoustic level exceeds the threshold. In this example, the acoustic transducer has a flat response in a voice frequency range in which the acoustic transducer is substantially equally sensitive to frequencies in the voice frequency range. In some examples, the threshold level is between 60 dB SPL and 90 dB SPL at a frequency in the banded frequency range. In other examples, the threshold level is between 40 dB SPL and 110 dB SPL at a frequency in the banded frequency range. In this example, the frequency range comprises 300 Hz-5 kHz. That is, the first circuit is configured to only process those signals and levels with the specified range, which in this example is 300 Hz-5 kHz, but there could be other specified ranges. For those signals within the 300 Hz-5 kHz, the first circuit is further configured to detect which one of those signals exceeds a specified threshold (e.g., predefined threshold). In this example, the first circuit is in a power mode that consumes less than 350 microwatts. In another example, the first circuit is in a power mode that consumes approximately 20 microwatts, that consumes a range of approximately 20-350 microwatts and so forth. In still other variations, the power mode that consumes less than 350 microwatts is a power mode of less than 200 microwatts. The power mode that consumes less than 350 microwatts is a power mode of less than 100 microwatts. The power mode that consumes less than 350 microwatts is a power mode of less than 50 microwatts.

In some examples, the device further includes a second circuit configured to generate a second signal at least partly based on the first signal of the first circuit. In this example, the banded acoustic level comprises a limit at the acoustic level. The banded acoustic level is banded by the first circuit or banded at the first circuit in which the banding is done inside the first circuit. In this example, the first circuit banded over the frequency range comprises the acoustic transducer banded by mechanics of the acoustic transducer in which the acoustic transducer mechanically has a resonant frequency of the acoustic transducer such that the acoustic transducer does not sense frequencies outside the frequency range because such outside sensing is beyond mechanics of the acoustic transducer. In this example, the holes in a diaphragm (of the acoustic transducer) itself are banded at the low frequency. In this example, a high frequency does not have time to equalize. As such, a user would hear the high frequency sounds, but not the low frequency sounds. That is, the first circuit is banded mechanically by the resonance of the device. In still another example, the first circuit is banded electrically, rather than being banded mechanically. In electrical banded, the first circuit is limited in the high frequency side. Mechanics include mechanical or hardware capabilities. Banded by the first circuit includes the first circuit being configured to only detect a certain acoustic range. The device comprises a packaged device with an acoustic filter before an input port of the packaged device or of the acoustic transducer to acoustically band the first circuit.

In another example, the first circuit is configured to compute an average acoustic level, e.g., from a plurality of acoustic levels that each occur within a specified amount of time or period of time. In this example, the acoustic levels that are included in the average calculation are only those acoustic levels that occur within the specified frequency range, e.g., within 300 Hz-5 kHz. From that calculated average, the first circuit is configured to determine when the calculated average exceeds a threshold. In a variation of each of the foregoing examples (and more generally examples described herein), the device includes a sensor and the techniques described herein are performed with regard to a sensor.

The device also includes a second circuit configured to generate a second signal, at least partly based on the first signal of the first circuit. In this example, the second circuit is further configured to transmit the second signal to a digital system to cause the digital system to power on and to perform digital signal processing (DSP). In yet another example, the second circuit is configured to transmit the second signal to another system to cause that other system to perform one or more actions responsive to the second signal.

In an example, the device is a microphone and is included within another device (e.g., a smart speaker device—a device that turns on when a user speaks to it). In this example, when no user is speaking to the smart speaker device, only the microphone is turned on, which consumes less than 10 microAmps. Because the microphone is an analog device, the entire smart speaker device operates as an analog device, e.g., when it is listening for sound/acoustic level. In this mode, the first circuit is configured to detect only acoustic levels (e.g. rather than specific words or key words) that exceed a specified threshold and that occur within a specified range. Because the first circuit consumes less than 200 microwatts in this detection state, the smart speaker device can operate at very low power. The first circuit operates at such a low power state, because it is only detecting and evaluating frequencies or acoustic levels, not words or other forms of speech. In this low power state, the smart speaker system doesn't need to have its digital or digital signal processing (DSP) systems or components running. Rather, the smart speaker system can operate entirely in an analog mode. Then, once the first circuit detects that an acoustic level (or average acoustic level) exceeds the threshold, the first circuit generates a signal that causes the smart speaker device to power on its digital system and to perform keyword detection, e.g., to detect if the spoken word matches a keyword to "wake-up" the smart speaker system. In some examples, a detection criteria (that the first circuit implements for detection) specifies that an input pressure stimulus to the sensor reaches a threshold input level a certain number of times. In this example, the threshold input level is a threshold acoustic input level. In other examples, the first circuit is configured to detect when the acoustic level of the acoustic transducer exceeds the threshold level a certain number of times. In still other examples, the first circuit is configured to detect when the signal level of the sensor exceeds the threshold level a certain number of times.

In particular, upon successful detection, the first circuit generates a first signal and transmits that first signal to a second circuit. The second circuit then generates a second signal (based on the first signal) and transmits that second signal to another system (that performs DSP) within the smart speaker device. In this example, the first signal specifies if the received audio input (or other input, such as a pressure input) has exceeded a threshold or not. The second signal is doing something with that information (that specifies whether the threshold is exceeded), e.g., by including an instruction to perform some action—such as, e.g., turning on a light. In an example, the second circuit simply re-transmits the first signal, e.g., rather than generating a second signal. In this example, the acoustic transducer comprises a piezoelectric acoustic transducer or a capacitive acoustic transducer. The first circuit comprises an analog circuit, the second circuit comprises an analog circuit or the first and second circuits each comprise an analog circuit. The device itself comprises an analog device and/or is a packaged device.

In another example, the device (which includes the first and second circuits) is attached to or is in proximity to a physical device (e.g., such as a desk). In this example, the device detects movement at the desk (e.g., when the device includes a sensor, such as, an accelerometer, a chemical sensor, an ultrasonic sensor, an acoustic, piezoelectric transducer, a piezoelectric sensor, an acoustic transducer, an acoustic sensor, or a gyroscope). In this example, the device detects movement via a first circuit (included in the device) configured to detect when an energy level (e.g., rather than a frequency level) banded over a frequency range exceeds a threshold level or when an average energy level for a plurality of energy levels that are each banded over the frequency range for a period of time exceeds the threshold level and is further configured to produce a first signal. In this example, the average energy levels are computed by the first circuit using the same techniques described above with regard to computing an average acoustic level. The device also includes a second circuit for generating a second signal at least partly based on the first signal of the first circuit. In this example, when then first circuit detects that the energy level (or the average energy level) exceeds a specified threshold, the first circuit transmits a signal to the second circuit, which in turn transmits another signal (e.g., based on or the same as the signal received from the first circuit) to another device or electronic system, e.g., a device for turning on the lights. In this example, the lights are turned on when the device (that includes the first circuit and the second circuit) detects movement at the desk and/or in proximity to the desk. The device in this example includes and/or performs the above-described functionality and features.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible program carrier for execution by, or to control the operation of, a processing device. Alternatively or in addition, the program instructions can be encoded on a propagated signal that is an artificially generated signal, e.g., a machine-generated electrical, optical, or electromagnetic signal that is generated to encode data for transmission to suitable receiver apparatus for execution by a processing device. A machine-readable medium can be a machine-readable storage device, a machine-readable hardware storage device, a machine-readable storage substrate, a random or serial access memory device, or a combination of one or more of them.

The term "processing device" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, an data base management system, an operating system, or a combination of one or more of them.

A computer program (which may also be referred to as a program, software, a software application, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM. EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specific implementation details, these should not be construed as limitations on the scope of any of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

The invention claimed is:

1. A device comprising:

a piezoelectric micro electro-mechanical systems (MEMS) transducer having an output;

a controllable switch having a control input and configured to provide power to one of a first output or a second output;

a detection circuit banded over a frequency range and having a signal input coupled to the output of the piezoelectric MEMS transducer, wherein the detection circuit is further coupled to the first output of the controllable switch, wherein the detection circuit is configured to produce a first signal at an output of the detection circuit based on an acoustic level of the piezoelectric MEMS transducer exceeding a threshold level; and a second circuit coupled to the second output of the controllable switch and the piezoelectric MEMS transducer, wherein the controllable switch is configured to alternate between providing power to the detection circuit via the first output of the controllable switch and providing power to the second circuit via the second output of the controllable switch based on the first signal.

2. The device of claim 1, wherein the detection circuit is configured to detect when the acoustic level of the piezoelectric MEMS transducer exceeds the threshold level.

3. The device of claim 2, wherein, to detect when the acoustic level of the piezoelectric MEMS transducer exceeds the threshold level, the detection circuit is configured to detect when the acoustic level of the piezoelectric MEMS transducer exceeds the threshold level a certain number of times.

4. The device of claim 2, wherein, to detect when the acoustic level of the piezoelectric MEMS transducer exceeds the threshold level, the detection circuit is configured to detect when an average banded acoustic level for the piezoelectric MEMS transducer for a period of time exceeds the threshold level.

5. The device of claim 1, wherein the threshold level comprises a threshold acoustic level.

6. The device of claim 1, wherein the piezoelectric MEMS transducer has a flat response in a voice frequency range in which the piezoelectric MEMS transducer is substantially equally sensitive to frequencies in the voice frequency range.

7. The device of claim 1, wherein the second circuit is configured to generate a second signal at least in part based on the first signal of the detection circuit.

8. The device of claim 7, wherein the second circuit is further configured to transmit the second signal to a digital system to cause the digital system to power on and to perform digital signal processing (DSP).

9. The device of claim 1, wherein the detection circuit banded over the frequency range comprises the piezoelectric MEMS transducer banded by mechanics of the piezoelectric MEMS transducer in which the piezoelectric MEMS transducer mechanically has a resonant frequency such that the piezoelectric MEMS transducer does not sense frequencies outside the frequency range.

10. The device of claim 9, wherein the mechanics comprise mechanical or hardware capabilities.

11. The device of claim 1, wherein the detection circuit is configured to only detect a certain acoustic range.

12. The device of claim 1, wherein the detection circuit comprises an analog circuit.

13. The device of claim 1, wherein the device comprises an analog device.

14. The device of claim 1, wherein the device is configured to operate at an analog level.

15. The device of claim 1, wherein the device comprises a packaged device.

16. A method comprising:

producing, using a detection circuit banded over a frequency range, a first signal at an output of the detection circuit based on an acoustic level of a signal from a piezoelectric micro electro-mechanical systems (MEMS) transducer exceeding a threshold level; and alternating, using a controllable switch, between providing power to the detection circuit via a first output of the controllable switch and providing power to a second circuit via a second output of the controllable switch based on the first signal, wherein the second circuit is coupled to the second output of the controllable switch and the piezoelectric MEMS transducer.

17. The method of claim 16, further comprising detecting, using the detection circuit, when the acoustic level of the signal from the piezoelectric MEMS transducer exceeds the threshold level.

18. The method of claim 17, wherein detecting when the acoustic level of the signal from the piezoelectric MEMS transducer exceeds the threshold level comprises detecting when the acoustic level of the signal from the piezoelectric MEMS transducer exceeds the threshold level a certain number of times.

19. The method of claim 17, wherein detecting when the acoustic level of the signal from the piezoelectric MEMS transducer exceeds the threshold level comprises detecting when an average banded acoustic level for the signal from the piezoelectric MEMS transducer for a period of time exceeds the threshold level.

20. The method of claim 16, wherein the threshold level comprises a threshold acoustic level.

21. The method of claim 16, wherein the piezoelectric MEMS transducer has a flat response in a voice frequency range in which the piezoelectric MEMS transducer is substantially equally sensitive to frequencies in the voice frequency range.

22. The method of claim 16, further comprising generating, using the second circuit, a second signal at least in part based on the first signal of the detection circuit.

23. The method of claim 22, further comprising transmitting, using the second circuit, the second signal to a digital system to cause the digital system to power on and to perform digital signal processing (DSP).

24. The method of claim 16, wherein the detection circuit banded over the frequency range comprises the piezoelectric MEMS transducer banded by mechanics of the piezoelectric MEMS transducer in which the piezoelectric MEMS transducer mechanically has a resonant frequency such that the piezoelectric MEMS transducer does not sense frequencies outside the frequency range.

25. The method of claim 16, wherein the detection circuit is configured to only detect a certain acoustic range.

26. The method of claim 16, wherein the detection circuit comprises an analog circuit.

27. The method of claim 16, wherein the power is provided to the detection circuit via the first output of the controllable switch when the second circuit is not processing the first signal.

* * * * *